BEST AVAILABLE COPY

V. H. LYON.

Fruit Gatherer.

No. 3,060.

Reissued Aug. 4, 1868.

WITNESSES:

O. F. Mayhew

Geo. H. Worley

INVENTOR.

Virgil H. Lyon.

N. PETERS, Photo-Lithographer, Washington, D. C.

Sheet 2, 2 Sheets.

V. H. Lyon.

Fruit Gatherer.

No. 3,060. Reissued Aug. 4. 1868.

Witnesses:
O. F. Wagner
[illegible]

Inventor:
Virgil H. Lyon

N. PETERS, PHOTO-LITHOGRAPHER, WASHINGTON, D. C.

UNITED STATES PATENT OFFICE.

VIRGIL H. LYON, OF PLAINFIELD, INDIANA.

IMPROVEMENT IN FRUIT-GATHERERS.

Specification forming part of Letters Patent 75,035, dated March 3, 1868; Reissue No. 3,060, dated August 4, 1868.

*To all whom it may concern:*

Be it known that I, VIRGIL H. LYON, of Plainfield, in the county of Hendricks and State of Indiana, have invented a new and useful Improvement in Fruit-Gatherers; and I do hereby declare the following to be a full, clear, and exact description thereof, which will enable skilled artisans to make and use the same, reference being had to the accompanying drawings, and to the letters of reference marked thereon, making part of this specification.

My invention relates to the form of the head and to the arrangement and relative position of the fingers thereon in that class of fruit-gatherers in which an open head furnished with fingers is mounted on a handle and having a hose or sack attached is employed; and it consists in giving the head such form and arranging the fingers in such manner as to make it more adaptable to detach the fruit either singly or in clusters, combining therewith lightness, simplicity, and cheapness of construction, and, together with the hose and handle, making the fruit on every part of the tree accessible.

Figures 1, 2:
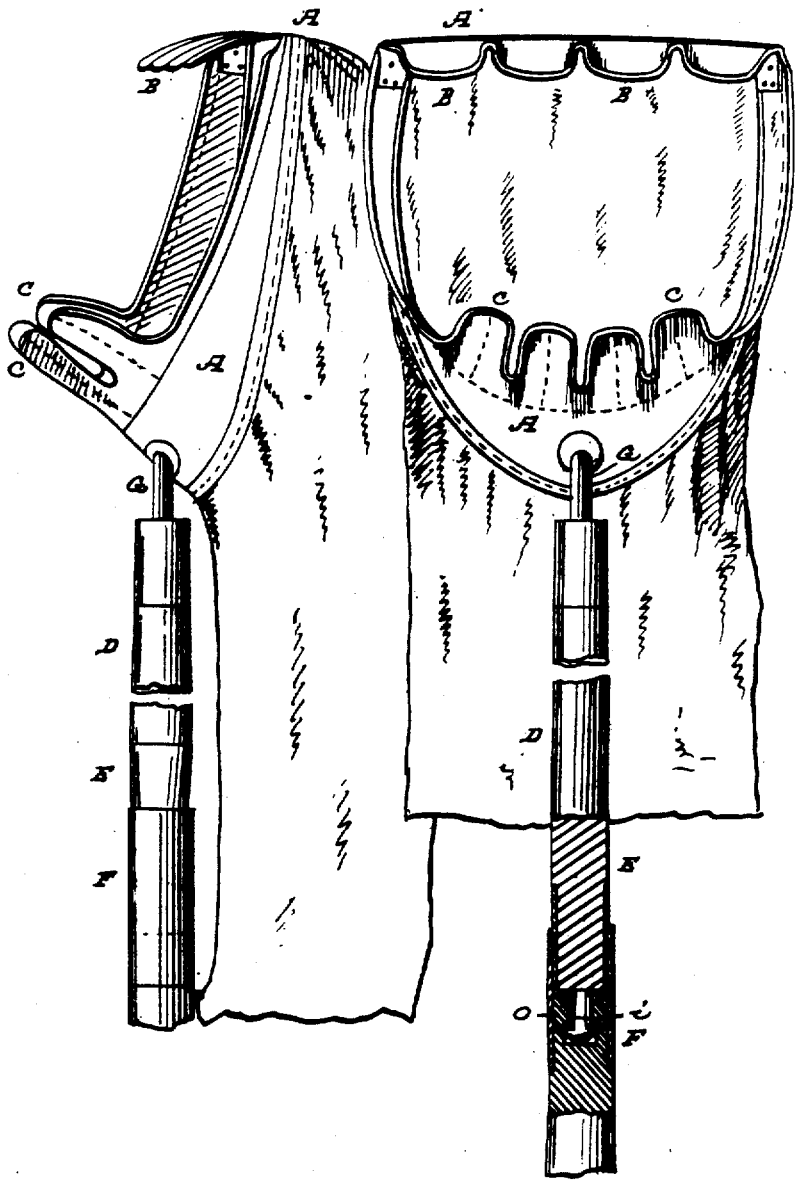
Figure 4:
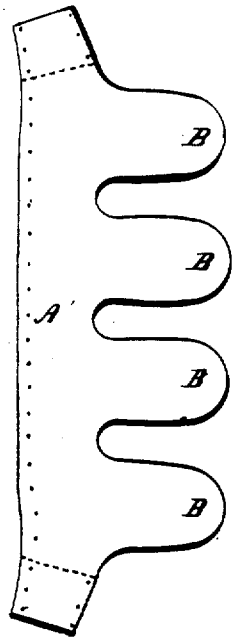
Figure 3:
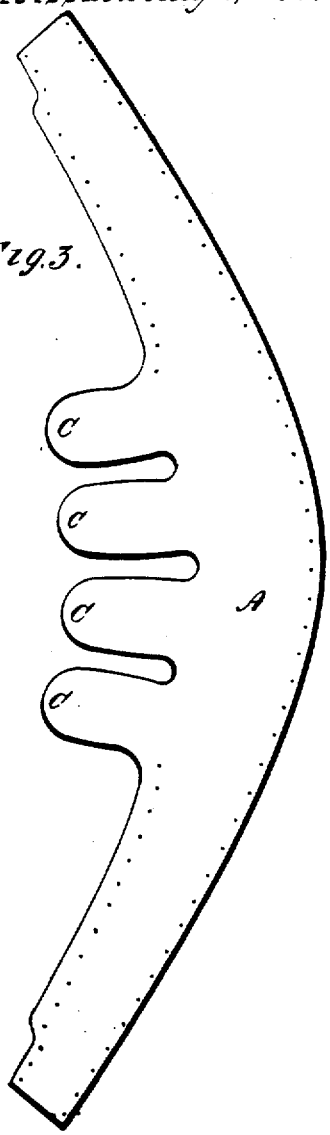

Figure 1 is a front view of the implement. Fig. 2 is a perspective side view of the same. Figs. 3 and 4 show the forms of the pieces of which the head is composed.

Similar letters of reference indicate like parts in the several figures.

The head of the implement may be made of sheet or malleable cast metal or other suitable material, the lower part being of the form shown in A, Fig. 3, and the upper part of the form shown in A′, Fig. 4, these two pieces, when properly bent and joined together, constituting the head and fingers, having the form and arrangement shown in Figs. 1 and 2. The sides of the head and their front edges, and the outside edges of the outside fingers, C, at the bottom, are flared outward. The ends of the outside fingers at the bottom are also bent downward nearly on a line with the middle fingers, so as to present a flattened or rounded surface to the fruit, whether detached by the upper or lower fingers, while the bottom part of the head slopes downward and backward in order to conduct the fruit into the hose or sack S. The top part, A′, of the head and fingers B are set in a straight or only slightly-curved line, as being better adapted to take hold of the fruit, especially when hanging in clusters. The fingers are made broad and nearly flat, and, together with the inside of the head, may be lined with any suitable soft material, to prevent bruising the fruit, stitched to the head and fingers, as indicated by the red lines in the drawings, or may be secured in any other convenient manner, or the sack S may be attached to the head, so as to form additional thickness to the lining. The fruit is taken off by the fingers B by pulling the implement downward, and by the fingers C by raising or pushing it upward. The upper part of the head may be extended in width, and the number of fingers increased, if desired. It is not necessary, however, to increase the number of the fingers C, as they are principally used as a convenient means of picking off such fruit as may hang against or too near a limb, or in other inconvenient position to be taken off by fingers B. The head is furnished with a shank, G, riveted or cast thereto at the bottom, by which it is attached to the handle D, as shown. The handle D is made in sections of convenient length, so that it may be increased or diminished in length at pleasure. The joints by which the sections of the handle are united consists of the ordinary ferrule, E F, as shown in Fig. 2, and are secured from being pulled apart by means of the locking-pin *i*, fixed in the upper section, the head of which is flattened, to enter a slot cut longitudinally in the thin metal plate O, inserted near the end of the lower section, as shown in Fig. 1.

For convenience of separating and putting together the handle, the ferrules are marked with dots, or otherwise, to indicate when the flattened head of the pin is in the proper position to enter, and also when it is turned across the slot in the piece O, by which the sections are prevented from being separated.

It is found in practice that much of the fruit hangs to the tree with considerable tenacity, in consequence of which it is liable to slip from the fingers when pulling it. To obviate this, I give the upper fingers, B, a suitable curve to hold the fruit, and thus its reception into the sack is made more certain.

The upper part, A′, of the head, to which the fingers B are attached, may be strengthened by an additional thickness, if found necessary.

In order to facilitate handling the instrument, and to prevent the fruit from being bruised by falling directly to the ground through the hose, I have attached small rings or eyes to the latter and corresponding hooks to the handle, so that the hose may be looped thereto, as desired, thus placing the hose at all times within control of the operator without his having to give it particular attention.

Having thus fully described my invention, what I claim, and desire to secure by Letters Patent, is—

1. The head A A′, furnished with the fingers C and B, when formed, constructed, and arranged substantially as herein shown and described.

2. The head A A′, in combination with the sack or hose S, substantially as herein specified.

3. The sectional handle D, constructed as described, in combination with the head A A′, substantially as and for the purpose set forth.

VIRGIL H. LYON.

Witnesses:
O. F. MAHEW,
WM. H. WEEKS.